United States Patent
Kamada et al.

(10) Patent No.: US 6,750,989 B1
(45) Date of Patent: Jun. 15, 2004

(54) IMAGE READING APPARATUS AND IMAGE FORMING APPARATUS

(75) Inventors: Takashi Kamada, Hino (JP); Koji Washio, Hachioji (JP); Yoshiyuki Ichihara, Hachioji (JP); Shizuo Kayano, Hachioji (JP)

(73) Assignee: Konica Corporation, Tokyo (JP)

( * ) Notice: Subject to any disclaimer, the term of this patent is extended or adjusted under 35 U.S.C. 154(b) by 534 days.

(21) Appl. No.: 09/619,769

(22) Filed: Jul. 19, 2000

(30) Foreign Application Priority Data

Jul. 21, 1999 (JP) .......................... 11-205512

(51) Int. Cl.⁷ .................. H04N 1/32; H04N 1/04; G06K 9/64; G06K 9/32
(52) U.S. Cl. ............. 358/488; 358/444; 358/497; 382/289; 382/296
(58) Field of Search ............... 358/488, 444, 358/497, 498, 474; 382/296, 191, 291, 289, 297

(56) References Cited

U.S. PATENT DOCUMENTS

| | | | |
|---|---|---|---|
| 4,958,221 A | | 9/1990 | Tsuboi et al. |
| 5,093,653 A | * | 3/1992 | Ikehira ...................... 345/657 |
| 5,191,438 A | * | 3/1993 | Katsurada et al. .......... 382/290 |
| 5,311,248 A | | 5/1994 | Iwata |
| 5,854,964 A | * | 12/1998 | Atsumi ....................... 399/371 |
| 6,111,667 A | * | 8/2000 | Mishima et al. ............ 358/488 |

FOREIGN PATENT DOCUMENTS

| | | |
|---|---|---|
| EP | 0 714 196 A1 | 5/1996 |
| EP | 0 757 471 A2 | 2/1997 |
| JP | 60-120669 | 6/1985 |
| JP | 10-285379 | 10/1998 |

* cited by examiner

*Primary Examiner*—Edward Coles
*Assistant Examiner*—Jason Sherrill
(74) *Attorney, Agent, or Firm*—Frishauf, Holtz, Goodman & Chick, P.C.

(57) ABSTRACT

An image reading apparatus, comprises an image reader to read images of a document; a rotation processor to conduct a rotation processing for image data obtained through reading by the image reader in accordance with inclination of the document; a memory in which image data subjected to rotation processing by the rotation processor are stored; and an external inputting device to input arbitrary rotation angles. When the rotation angles are inputted from the external inputting device, the image data obtained through reading by the image reader are subjected to the rotation processing in accordance with the inputted rotation angle and are stored in the memory.

6 Claims, 5 Drawing Sheets

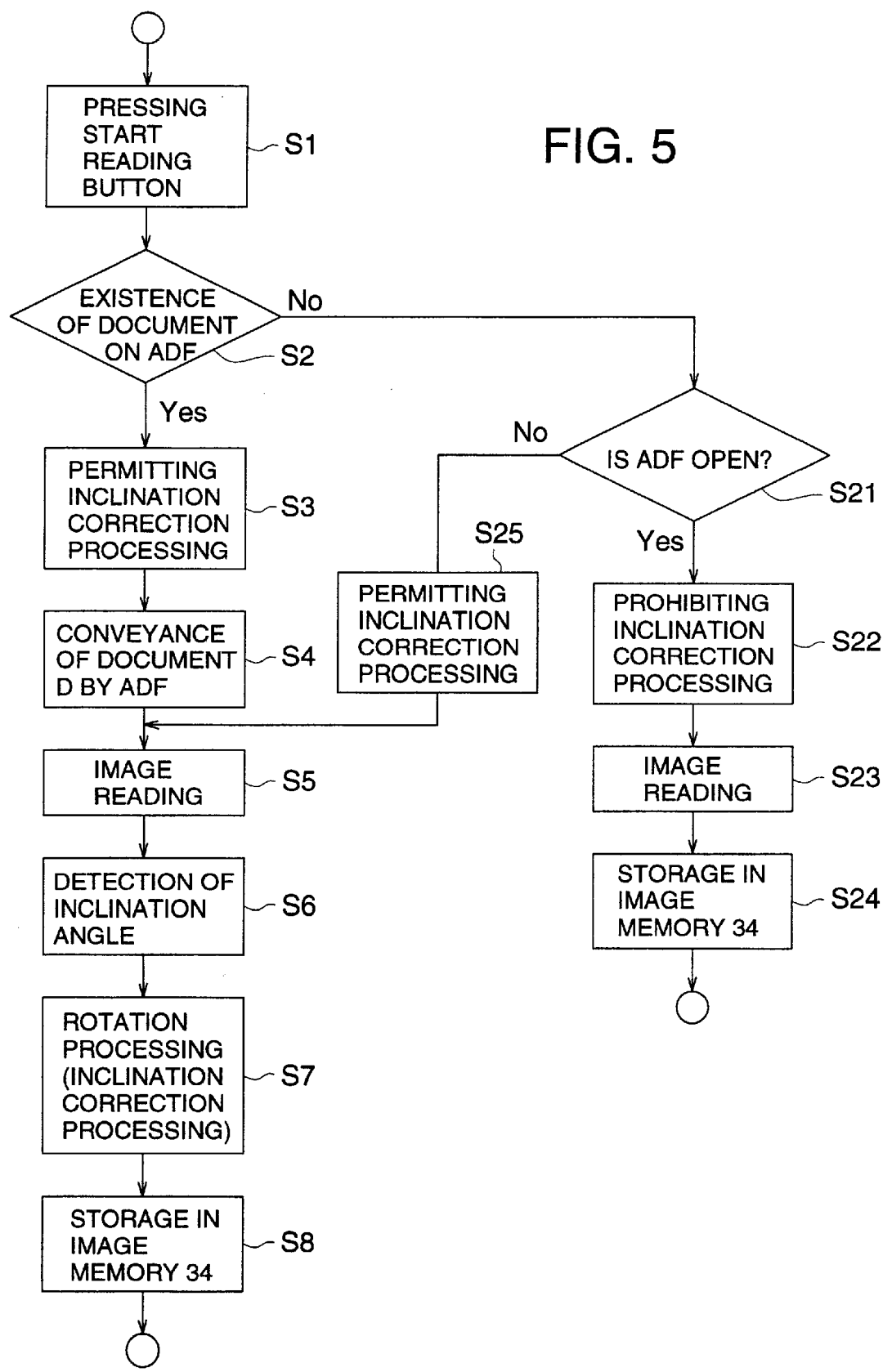

IMAGE READING APPARATUS AND IMAGE FORMING APPARATUS

BACKGROUND OF THE INVENTION

The present invention relates to an image reading apparatus which reads an image of a document and to an image forming apparatus equipped with the image reading apparatus.

In the case of an image reading apparatus which reads an image of a document, there sometimes are occasions where images are read under the condition that a document is skewed. When images are formed based on image data obtained from the skewed document through reading, it sometimes occurs that a recording material such as a recording sheet can not always cover all images on the document and a formed image proves to be a broken image.

Therefore, as seen in TOKKAISHO No. 60-120669 and TOKKAIHEI No10-285379, there has been suggested an image reading apparatus wherein an inclination of a document is detected by an inclination detection means, and an inclination is corrected by performing rotation processing such as affine transformation or shift processing for the obtained image information in accordance with the detected inclination of a document.

In the image reading apparatus stated above, however, it was impossible for a user to incline a document intentionally, because an inclination is corrected automatically when the inclination of the document is detected by an inclination detection means. For making such intention of a user to be reflected, there is available a method wherein an external inputting means is provided on an operation section and an arbitrary rotation angle is indicated and inputted. In this case, however, if original correction of an inclination in an image reading apparatus has priority to user's indication and inputting, an intention of the user to incline intentionally is ignored.

In an image reading apparatus which is structured to read a document conveyed by an automatic conveyance means (ADF), an arrangement is made so that not only a document conveyed by the automatic conveyance means but also a document placed directly on a platen may be read. In the image reading apparatus of this kind, it is effective to correct inclination in accordance with an inclination of a document. However, when a user places a document directly on a platen, the user sometimes places a document to be inclined intentionally, and if the inclination is corrected even in this case, an intention of the user to incline intentionally is ignored.

In the case of an image reading apparatus to read a document placed directly on a platen, there are known some types wherein a document on the platen is held down by a platen cover that is provided flexibly. When reading images of a document placed directly on the platen in the image reading apparatus of this kind, the platen cover is sometimes kept closed or opened depending on operations of a user. When a twice-folded document is placed on the platen after its crease is opened, and the platen cover is closed for reading, for example, the crease of the document is hit by the platen cover when a user closes the platen cover. Therefore, the document is shifted on the platen to be inclined against the user's intention in many cases, which makes it impossible to read images accurately. On the other hand, when the platen cover is kept opened for reading, a user often holds down the document with its hand, touching the back side of the document, and in this case, it sometimes happens that the user places the document to be inclined intentionally. Even in this case, an intention of the user is capable of being ignored unless inclination correction is properly operated.

Incidentally, the image reading apparatus having the aforesaid function of inclination correction is equipped on an image forming apparatus such as copying machine together with an image forming means which forms images on a recording sheet based on image data obtained through image reading. In recent years, the image forming apparatus of this kind is equipped with various operation modes in the trend of high grade functions. As one of them, there is owned a trial mode which is called a single step mode or a sample mode. This trial mode is a mode wherein when making plural sets of the number of sheets of image forming (number of copies) based on image data obtained through reading, the image data obtained through reading are temporarily stored in a storage means, then, only one set of image forming based on the stored image data is printed as a sample, and image forming for the remaining sets is conducted if the sample agrees with an intention of a user.

On the occasion of this trial mode, when the aforesaid inclination correction is wrong, the inclination correction needs to be amended further, and rotation processing is conducted for the corrected image data, namely, inclination correction is made plural times for the image data obtained through reading, further, because the image data stored in the storage means are image data which have been subjected to inclination correction, which results in deterioration of image quality.

SUMMARY OF THE INVENTION

An object of the present invention is to make it possible to read an image on a document if the document is intentionally inclined and set on the inclined condition by a user in an image reading apparatus capable of correcting inclination for the image of the document read by a reading device.

Further, another object of the invention is to provide an image reading apparatus wherein an original function of inclination correction of a document reading apparatus and a function to conduct rotation processing based on input of rotation angle conducted by a user from an external inputting means are selected on an optimum basis according to circumstances.

Furthermore, another object of the invention is to provide an image reading apparatus wherein, when conveying a document to a reading position by an automatic conveyance means, an original function of the image reading apparatus to correct inclination is permitted, while, when a document is placed directly on a platen by a user, the function to correct inclination is prohibited to operate so that an intention of the user may be reflected.

Still furthermore, another object of the invention is to provide an image forming apparatus wherein, even when inclination of image data is corrected again and even when rotation processing by rotation angle inputted by a user is conducted plural times in execution of plural operations of image processing like a trial mode, image quality is not deteriorated.

The object of the invention can be solved by the image reading apparatus described in Structure (1). Namely, the image reading apparatus is represented by an image reading apparatus having therein an image reading means which reads images of a document, a rotation processing means which conducts rotation processing for image data obtained through reading by the image reading means, and a storage means in which image data subjected to rotation processing by the rotation processing means are stored, wherein an external inputting means for inputting arbitrary rotation angle is provided, and image data obtained through reading by the image reading means are subjected to rotation processing and are stored in the storage means in accordance with the inputted rotation angle when the rotation angle is inputted from the external inputting means.

Since the rotation processing according to inclination of a document and the rotation processing based on the rotation angle made by a user from an external inputting means are selected on an optimum basis in accordance with circumstances, in the image reading apparatus, it was possible to obtain the image reading apparatus which makes it possible to obtain image data satisfying a user's intention.

The object of the invention can be solved also by the image reading apparatus described in Structure (2). Namely, the image reading apparatus of structure (2) is represented by an image reading apparatus having therein an image reading means which reads images of a document on a platen, an automatic conveyance means that conveys a document onto the platen, an inclination detection means that detects inclination of a document, a rotation processing means which conducts rotation processing for image data obtained through reading by the image reading means in accordance with inclination of a document detected by the inclination detection means, and a storage means in which image data subjected to rotation processing by the rotation processing means are stored, wherein an external inputting means for inputting arbitrary rotation angle is provided, and image data obtained through reading by the image reading means are subjected to rotation processing and are stored in the storage means in accordance with document inclination detected by the inclination detection means and the inputted rotation angle, when the rotation angle is inputted from the external inputting means.

In the image reading apparatus, since the rotation processing according to inclination of a document and the rotation processing based on the rotation angle made by a user from an external inputting means are selected on an optimum basis in accordance with circumstances, even when an automatic conveyance means is used, and rotation processing under consideration of document inclination caused on an automatic conveyance means is further conducted, it was possible to obtain the image reading apparatus which makes it possible to obtain image data satisfying a user's intention.

In these image reading apparatuses, when there is no input of rotation angle from the external inputting means, the rotation processing means can conduct rotation processing for image data obtained through reading by the image reading means, in accordance with inclination of the document.

In these image reading apparatuses, when there is no input of rotation angle, namely, when a user does not desire rotation processing based on the prescribed rotation angle, the rotation processing according to document inclination is selected and conducted. It was therefore possible to obtain the image reading apparatus which makes it possible to obtain image data satisfying a user's intention.

The object of the invention can be solved by the image reading apparatus described in Structure (3). Namely, the image reading apparatus of Structure (3) is represented by an image reading apparatus which has therein an image reading means which reads images of a document on a platen, an automatic conveyance means that conveys a document onto the platen, an inclination detection means that detects inclination of a document, a rotation processing means which conducts rotation processing for image data obtained through reading by the image reading means in accordance with inclination of a document detected by the inclination detection means, and a storage means in which image data subjected to rotation processing by the rotation processing means are stored, and reads images of a document conveyed by the automatic conveyance means or images of a document placed directly on the platen.

In the image reading apparatus, original correction of inclination in the image reading apparatus is permitted when a document is conveyed by the automatic conveyance means to the reading position, and the correction of inclination is prohibited when a document is placed by a user directly on the platen. It was therefore possible to obtain an image reading apparatus on which a user's intention can be reflected.

The object of the invention can be solved also by the image reading apparatus described in Structure (4). Namely, the image reading apparatus of structure (4) is represented by an image reading apparatus having therein an image reading means which reads images of a document on a platen, a flexible platen cover capable of covering the platen, an inclination detection means that detects inclination of a document, and a rotation processing means which conducts rotation processing for image data obtained through reading by the image reading means in accordance with the inclination of a document detected by the inclination detection means, wherein when reading images, inclination correction is permitted when the platen cover is closed, while, inclination correction is prohibited when the platen cover is opened.

In the image reading apparatus, correction of inclination is permitted when the platen cover is closed, and the correction of inclination is prohibited when the platen cover is opened. It was therefore possible to obtain an image reading apparatus in which a user's intention can be reflected on an optimum basis even under the condition that the platen cover is opened, representing the occasion where the possibility for a user to place a document to be inclined intentionally is high, among occasions for a user to place a document directly on the platen.

The object of the invention can be solved also by the image forming apparatus described in Structure (5). Namely, the image forming apparatus of structure (5) is represented by an image forming apparatus having therein an image reading means which reads images of a document, a rotation processing means which conducts rotation processing to correct inclination for image data obtained through reading by the image reading means in accordance with inclination of a document, a storage means in which image data which have been given rotation processing by the rotation processing means, and an image forming means which forms an image on a recording material based on image data stored in the storage means, wherein image data which have been subjected to rotation processing by the rotation processing means and image data obtained through reading by the image reading means are stored in the storage means.

Owing to this image forming apparatus, it was possible to obtain an image forming apparatus wherein image quality is not deteriorated even when inclination correction for image data is repeated and rotation processing for rotation angle inputted by a user is conducted plural times, in the case of conducting image processing plural times as in the trial mode.

It is preferable for this image forming apparatus to be provided with a trial mode to conduct image forming for one set before conducting image forming for plural sets, and to conduct image forming for the first set in the trial mode based on the image data which have been subjected to the rotation processing by the rotation processing means and have been stored in the storage means.

Owing to this image forming apparatus, it was possible to obtain an image forming apparatus wherein image quality is not deteriorated even when inclination correction for image data to make one set of prints as a sample is repeated and rotation processing for rotation angle inputted by a user is conducted plural times, in the trial mode.

It is preferable for this image forming apparatus to be characterized in that an external inputting means is provided, and when a rotation angle is inputted from the external inputting means after image forming for the first set in the trial mode, rotation processing is conducted for the image data obtained through reading by the image reading means and stored in the storage means in accordance with the inputted rotation angle, and image forming is conducted based on the image data which have been subjected to the rotation processing.

In this image forming apparatus, when making prints for one set as a sample in the trial mode, rotation processing is conducted for image data obtained through reading by an image reading means for output for the second set and thereafter, and image forming is conducted based on the image data. It was therefore possible to obtain an image forming apparatus wherein image quality is not deteriorated even when rotation processing for rotation angle inputted by a user is conducted plural times.

BRIEF DESCRIPTION OF THE DRAWINGS

FIG. 5 is a flow chart illustrating procedures of determination of permission/prohibition for inclination correction processing.

DETAILED DESCRIPTION OF THE PREFERRED EMBODIMENT

Prior to explanation of an embodiment of the invention, an outline of an image reading apparatus and an image forming apparatus will be explained as follows, referring to FIGS. 1 and 2. Though there will be explained, in this case, an example of an image reading apparatus which is provided on the image forming apparatus (a copying apparatus or a printer) and forms an image on a recording sheet in the aforesaid image forming apparatus based on image data obtained through reading, the image reading apparatus can be the so-called scanner which is used independently.

Figure 1:
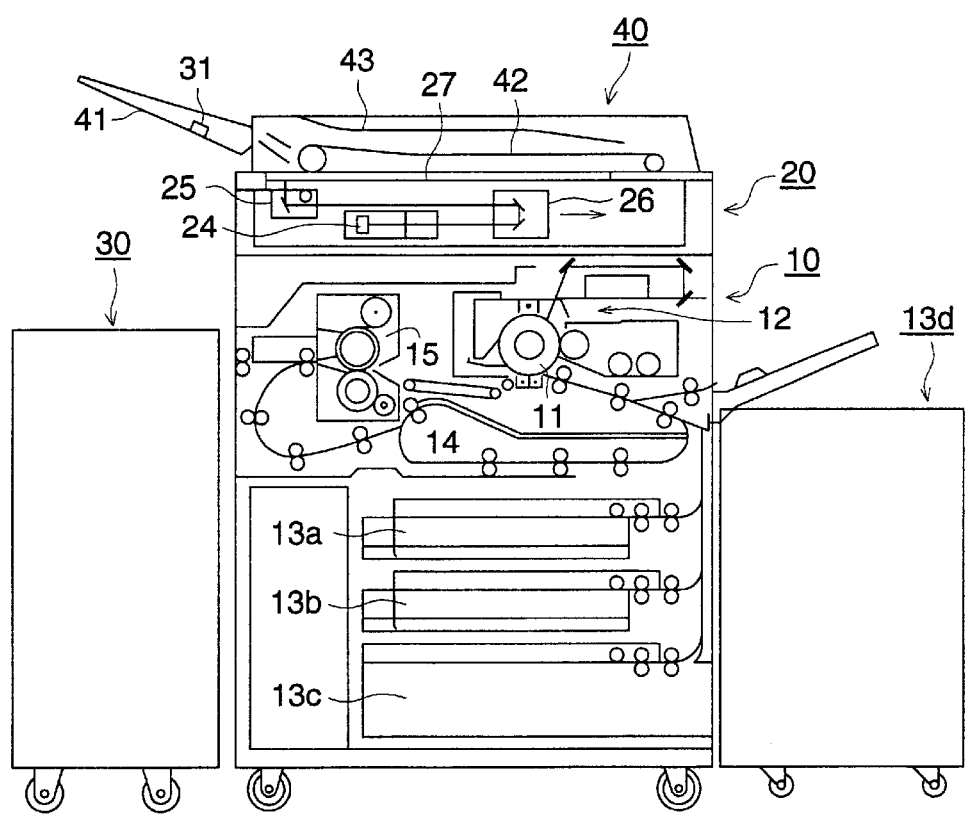
FIG. 1 is a front sectional view showing an outline of an image forming apparatus and an image reading apparatus.
Figure 2:
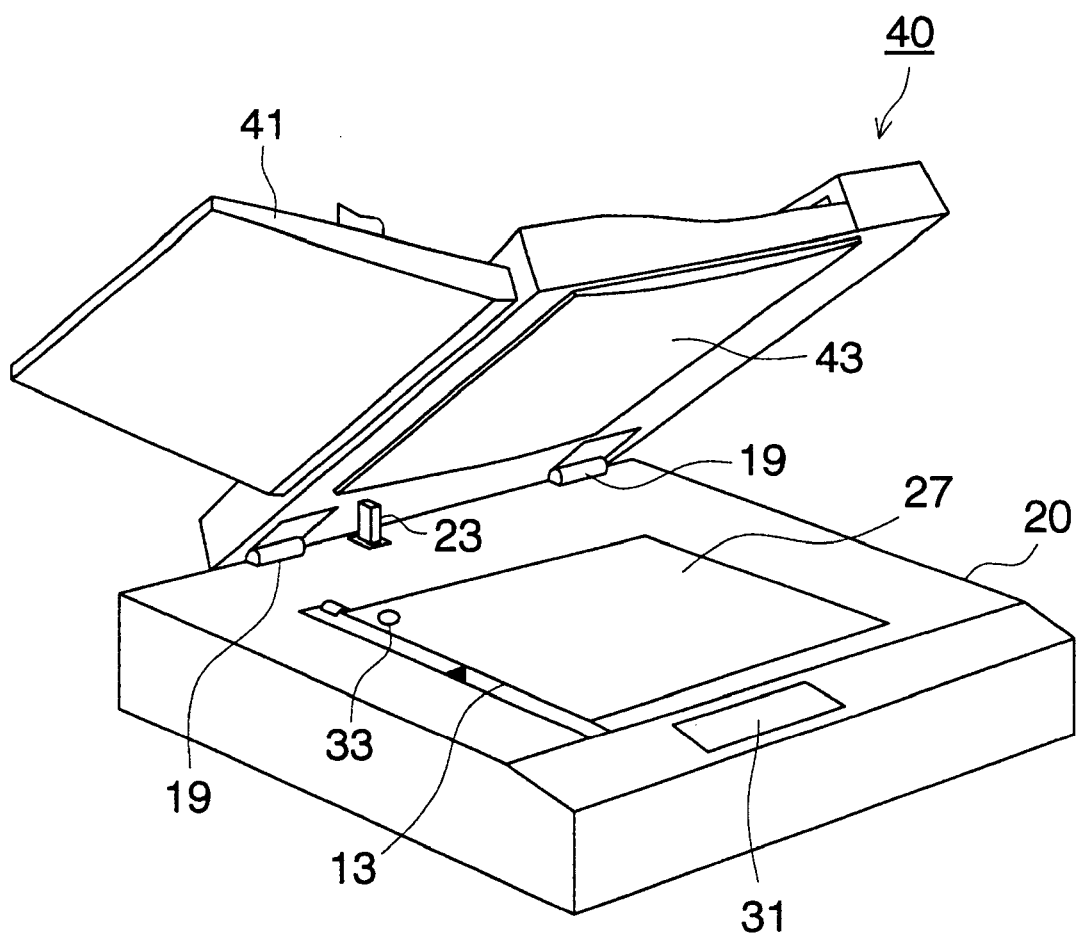
FIG. 2 is a perspective view showing an image reading section, an automatic conveyance section and a top portion of an image forming apparatus.

FIG. 1 is a diagram showing an outline of an image forming apparatus and an image reading apparatus in an embodiment of the invention.

In FIG. 1, the numeral 10 represents an image forming section which forms an image on a recording sheet through an electrophotographic system, 20 represents an image reading section which reads an image of document D and outputs image data, 40 represents an automatic conveyance section which conveys document D stacked to image reading section 20 and ejects the document D which has been read, and the numeral 50 represents a finishing section which conducts sorting, stapling and punching on recording sheets ejected out of image forming section 10.

Image forming section 10 has therein photoreceptor 11 on which a toner image is formed through charging, exposure and development, image forming unit 12 which transfers the toner image formed on photoreceptor 11 onto a recording sheet, sheet feed sections 13a, 13b, 13c and 13d each loading a recording sheet on which an image is formed, recording sheet reversing section 14 for two-sided image forming, and fixing unit 15 which fixes a toner image on a recording sheet.

Image reading section 20 has therein platen 27 on which document D is placed, image sensor 24 which receives image light and converts it into an image signal, movable scanning unit 25 which is composed of a lamp illuminating document D and of a mirror and scans document D placed on platen 27, and scanning unit 26 which is composed of two mirrors and can move at the speed which is one half that of the scanning unit 25. The image sensor 24 is a means to read images on document D for obtaining image data, and it is a photoelectric transfer element which is composed of a line sensor (line CCD) extending in the primary scanning direction and conducts photoelectric conversion on each pixel for light reflected from document D.

Automatic conveyance section (ADF) 40 is equipped with document feeding tray 41 on which document D is placed by a user and stand 43 on which the document D which has been read is placed. Conveyance belt 42 is a belt which conveys document D from the document feeding tray 41 to the document ejection stand 43, and it is trained about a driving roller (having no symbol) and a tension roller (having no symbol) to convey document D along platen 27. When conveying a document, conveyance belt 42 holds document D at prescribed position and ejects it to the document ejection stand 43 upon completion of reading by the image reading section 20.

ADF document sensor 31 is an optical sensor embedded in the document feeding tray 41, and it optically detects existence of document D placed on the document feeding tray 41, and it outputs the detection signals to control means 37.

Next, there will be explained by the use of perspective views for appearance of image reading section 20, automatic conveyance section 40 and an upper portion of the image forming apparatus.

Operation section 30 is composed of a touch panel provided on the upper portion on the front side of image reading section 20, and it is provided with rotation angle setting ten-key 30a which represents an external inputting means with which a user inputs an arbitrary rotation angle as stated later.

Automatic conveyance section 40 is provided on image reading section 20 through hinge 19 in a way that the automatic conveyance section 40 can be closed on or opened from the image reading section 20, so that the document D placed directly on platen 27 can be read.

When images of document D are read by automatic conveyance section 40, a user closes (brings down) the automatic conveyance section 40 and places document D to be read on document feeding tray 41. Then, the user designates the start of reading by pressing a start-reading button on operation section 30, thus, document D is conveyed automatically onto platen 27 and its image data are read by image reading section 20. When reading of image data is completed, document D is ejected to document ejection stand 43.

On the other hand, when reading document D after placing it directly on platen 27, a user opens automatic conveyance section 40, then places document D to be read on platen 27, and brings down the automatic conveyance section 40. When the user places document D on the platen 27 in this case, the document D is placed to be along standard plate 16 which is provided to be adjacent to platen 27 and serves as a standard for placing a document. Then, the user designates the start of reading by pressing a start-reading button on operation section 30, and image data of the document D are read by image reading section 20. In this case, however, even if the start-reading button is pressed, the automatic conveyance section 40 is not driven.

Image data are obtained after images on platen 27 are read by the image reading means and are subjected to amplifying processing and A/D conversion, and the image data thus obtained are stored in image memory 34 (see FIG. 3) representing a storage means.

Platen cover sensor 32 (see FIG. 3) is a contact sensor which detects opening and closing of the automatic conveyance section 40 according to the position of resin square bar 23 supported by a spring from the lower side, and it outputs detection signals which vary depending on the position of the square bar 23 which moves up and down depending on opening and closing of the automatic conveyance section 40.

Platen document sensor 33 optically detects existence of document D conveyed to and placed on platen 27 by a user manually, or by an automatic conveyance unit, and it outputs detection signals to control means 37. The platen document sensor 33 is installed at the position below the platen 27, namely, installed inside image reading section 20, and it executes optical detection through the platen 27 to detect at the emission timing in which stray light has no bad influence on image sensor 24.

Figure 3:
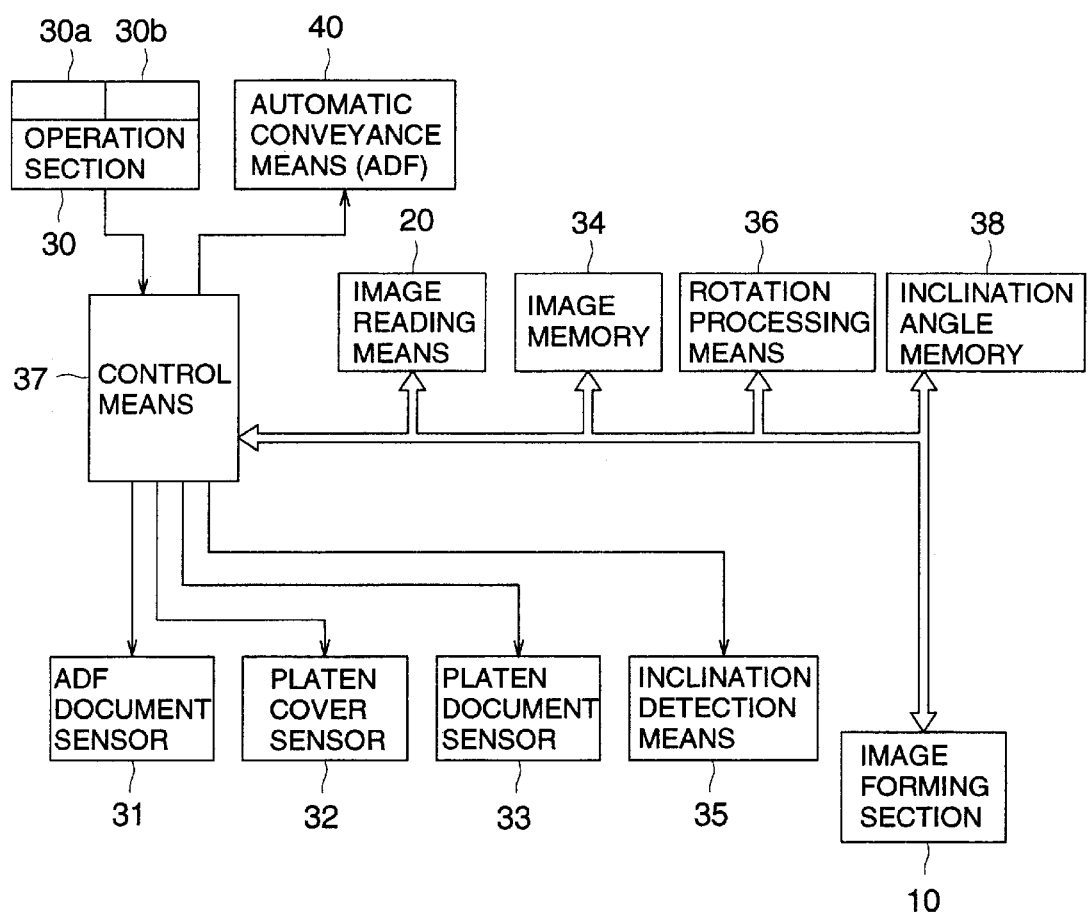
FIG. 3 is a block diagram showing illustratively the flow of image data about an outline of inclination correction.

FIG. 3 is a block diagram showing illustratively a flow of image data concerning an outline of inclination correction in the present embodiment. Incidentally, FIG. 3 is a diagram where image reading apparatus 1 is used as a scanner of a copying machine. When forming images, image data stored in image memory 34 are subjected, by an image processing means (having no symbol), to image processing such as shading correction, spatial frequency filtering, γ conversion, error diffusion processing, and image distinction/correction processing, or the image data are subjected to image processing before being stored in image memory 34, and image forming is conducted in image forming section 10 based on image data subjected to the image processing.

Operation section 30 is provided with a start-reading button, an arbitrary rotation mode selection button, rotation angle setting ten-key 30a, and trial mode selection button 30b. The rotation angle setting ten-key 30a is an external inputting means with which a user inputs a rotation angle. Incidentally, the external inputting means does not need to be limited to a ten-key, if a rotation angle intended by a user can be designated clearly, and it may be either one wherein a numerical value (rotation angle) to be displayed on a display portion is changed in accordance with an amount of operation of a jog dial or a volume knob to designate the rotation angle clearly, or one wherein a mark which varies in accordance with an amount of operation of a jog dial or a volume knob is provided, and a user designates the rotation angle clearly by eye measure.

Image reading section 20 is an image reading means which reads images of document D, and it reads images of document D on platen 27 to obtain image data. It is equipped with image sensor 24 representing a photoelectric transfer means in the present example, and it is explained in the example of an image reading means for obtaining digital image data to which various image processing methods can be applied.

Image memory 34 can store image data (original image data) obtained through reading by image reading section 20, image data processed by an image processing means and image data subjected to rotation processing by rotation processing means 36 by sorting them, and control means 37 can read respective image data freely.

As a result of detection of inclination for document D, inclination angles are stored in inclination angle memory 38.

Inclination detection means 35 analyzes image data obtained through reading and detects inclination of the image, and outputs signals of inclination angle corresponding to the inclination angle of document D to control means 37. In the present example, the inclination detection means 35 analyzes image data, provided with an edge portion extracting means, and compares edge data of the edge portion extracted with reference data corresponding to that in the case of no inclination, to conduct detection of inclination. The inclination detection means 35 has only to detect an amount of inclination of document D conveyed by automatic conveyance section 40 and an amount of inclination of document D placed on platen 27, and for example, it is also possible to detect inclination of document D by extracting a character sequence described on document D. Further, the inclination detection is not limited to one resorting to image processing, and it may also be one which optically detects.

Rotation processing means 36 is an image processing means which conducts rotation processing on image data, and it conducts rotation processing on image data through an image processing method such as affine conversion or shift processing. When control means 37 gives rotation angle signals corresponding to an amount of rotation which needs to be processed through rotation processing, the rotation processing means 36 conducts rotation processing on image data stored in image memory 34, in accordance with the rotation angle signals given. The image data on which the rotation processing has been conducted is stored again in image memory 34. When the rotation angle signals are not given, the rotation processing means 36 does not conduct rotation processing on image data.

Control means 37 is connected with image forming section 10, image reading section 20, operation section 30, automatic conveyance section 40, ADF document sensor 31, platen cover sensor 32, platen document sensor 33, image memory 34, inclination detection means 35 and with rotation processing means 36, and it controls all the operations of an image reading apparatus and an image forming apparatus.

For example, with regard to correction of inclination, when the control means 37 gives a designation angle to rotation processing means 36 in accordance with inclination angle signals outputted by inclination detection means 35, image data obtained through reading by image reading section 20 are subjected to processing of inclination correction, and then, are stored in inclination angle memory 38. Namely, the control means 37, inclination detection means 35 and rotation processing means 36 constitute an inclination correction means, and there is realized an inclination correction processing function which detects an inclination angle of document D and conducts correction for canceling it. With regard to the occasion where the control means 37 does not give the rotation angle signals to rotation processing means 36, it will be explained later.

Further, the control means 37 stores image data obtained by image reading section 20 and image data on which rotation processing has been conducted by rotation processing means 36 in the prescribed address space of image memory 34, then, reads image data stored to be used for image forming in image forming apparatus 10, and transfers data to image forming section 10.

Next, there will be given an explanation of the invention employing an image reading apparatus (image forming apparatus) provided with this inclination correction processing function.

When a user desires to conduct rotation processing with an arbitrary angle, the user presses an arbitrary rotation mode selection button provided on operation section 30 together with setting of the number of copies, and further conducts a setting job to input rotation angle from ten-key 30a for setting a rotation angle. When the setting job is completed, a start-reading button is pressed. Pressing of an arbitrary rotation mode selection button by the user and the rotation angle inputted from the ten-key 30a for setting a rotation angle are recognized by the control means 37.

After reading of images of document D placed on platen 27 is started, image data obtained through reading are stored in image memory 34. Then, rotation processing is conducted on image data by rotation processing means 36 equipped on the inclination correction means. Namely, when an arbitrary rotation mode selection button provided on operation section 30 is pressed and when a user inputs an arbitrary rotation angle from ten-key 30a for setting a rotation angle, the rotation angle thus inputted is stored in inclination angle memory 38. Then, the rotation processing is conducted on image data in the same way as in the foregoing, based not on the inclination angle of document D detected by inclination detection means 35, but on the rotation angle inputted from ten-key 30a for setting a rotation angle (external inputting means) and stored in inclination angle memory 38, and the image data are stored in image memory 34. Then, the image based on the image data on which the rotation processing has been conducted is formed on a recording sheet by image forming section 10 representing an image forming means.

When a rotation angle is inputted from ten-key 30a for setting a rotation angle by the use of an inclination correction means which corrects inclination, the rotation processing is conducted on the image data obtained through reading by image reading section 20, in accordance with the rotation angle inputted, and the image data are stored in image memory 34, as stated above. It is therefore possible to obtain the inclined image as intended by a user.

Incidentally, since it is structured so that rotation processing may be conducted only with the rotation angle inputted from the ten-key 30a for setting a rotation angle without using the inclination detected by inclination detection means 35, as stated above, it is especially effective when reading images of document D placed on platen 27. However, when convey document D automatically by the use of automatic conveyance section 40 and read images of the document D, inclination of the document D is caused in the course of conveyance by automatic conveyance section 40, and it causes troubles if a user conducts rotation processing only with the rotation angle inputted from ten-key 30a for setting a rotation angle. For example, when a user wishes to give the rotation of 30°, a directive corresponding to rotation angle 30° is inputted from ten-key 30a for setting a rotation angle. However, if it is assumed that improper conveyance causes some inclination of 15° on document D when it is conveyed to platen 27, when rotation processing is conducted based only on the value of 30° representing the rotation angle inputted from ten-key 30a for setting a rotation angle despite occurrence of inclination of 15°, image data rotated by the angle representing the sum total of the inputted rotation angle and the detected inclination angle, namely, by the angle of 30°+15°=45°, are stored in image memory 34. If the image data are outputted, there is outputted an image on which the rotation processing that is different from user's intention is conducted.

Therefore, when images of document D conveyed by automatic conveyance section 40 are read and when a rotation angle is inputted from ten-key 30a for setting a rotation angle, image data obtained through reading by a scanner are subjected to rotation processing, in accordance with data of inclination angle detected by the inclination detection means 35 and with the rotation angle inputted from ten-key 30a for setting a rotation angle, to be stored in image memory 34. Namely, by conducting rotation processing based on the inputted rotation angle for image data obtained through reading, after (or simultaneously with) the inclination correction based on the angle of inclination, it is possible to obtain an image wherein the inclination of document D caused by automatic conveyance section 40 is considered and the inclination intended by a user is reflected.

Incidentally, when a button for setting an arbitrary rotation mode provided on operation section 30 is not pressed, or when an arbitrary rotation angle is not inputted by a user from ten-key 30a for setting a rotation angle, rotation processing (inclination correction processing) is conducted for image data based on the inclination angle of document D detected by inclination detection means 35, as stated above.

Though it is structured in the present embodiment so that image data obtained through reading by a scanner are temporarily stored in image memory 34, and inclination correction and rotation processing are conducted by an inclination correction means for the image data stored in the image memory 34, it is preferable to conduct inclination correction and rotation processing for image data without storing the image data in image memory 34 temporarily, and to store the image data on which inclination correction and rotation processing have been conducted in image memory 34.

ADF document sensor 31 is a sensor for detecting existence of document D on document feeding tray 41 of automatic conveyance section 40, and it is used, in the present embodiment, to judge whether to use automatic conveyance section 40 or not when reading images of document D. Namely, when a start-reading button provided on operation section 30 is pressed, if the document D is detected by the ADF document sensor 31, the document D is automatically conveyed to platen 27 so that images on the document D are read, while, if document D is not detected by the ADF document sensor 31 and the document D exists on platen 27, the document D is not conveyed by automatic conveyance section 40 and images on the document D on platen 27 are read. Therefore, the ADF document sensor 31 detects whether to use automatic conveyance section 40 or not. In other words, the ADF document sensor 31 detects whether the document D having thereon images to be read was placed directly on platen 27 by a user or it is going to be conveyed by automatic conveyance section 40.

Though it is detected, in the present embodiment, whether to use automatic conveyance section 40 or not, depending on whether document D exists on ADF document sensor 31 or not, it is also possible to detect whether to use automatic conveyance section 40 or not by setting on operation section 30, or it is also possible to detect whether to use automatic conveyance section 40 or not by existence of document D on platen 27.

In the present embodiment, there is further provided platen cover sensor 32 which detects whether automatic conveyance section 40 provided in a way to be closed or opened to serve also as a cover of platen 27 is in its closed state or in its opened state.

In the present embodiment, there is made an arrangement wherein the ADF document sensor 31 and the platen cover sensor 32 are used to determine whether to conduct the inclination correction processing for document D or not. To be concrete, an explanation will be given by using a flow chart illustrating procedures to determine permission/prohibition of inclination correction processing shown in FIG. 4.

When a user wishes to read images of document D by the use of automatic conveyance section (hereinafter referred to as ADF) 40, the user places the document D on document feeding tray 41. After that, the user presses a start-reading button provided on operation section 30 (S1). When the start-reading button is pressed, existence of document D placed on ADF 40 is detected by ADF document sensor 31 (S2).

When document D is detected in S2, inclination of document D is detected by inclination detection means 35 as stated above, and control means 37 outputs inclination correction processing permission signals representing the signals which permit rotation processing (inclination correction processing) conducted by rotation processing means 36 based on inclination of document D (S3). In succession, there are executed conveyance of document D by ADF 40 (S4), reading of images (S5), detection of inclination angle by inclination detection means 35 (S6), rotation processing as inclination correction processing by rotation processing means 36 (S7) and storage of image data for which rotation processing has been conducted in image memory 34 (S8). Namely, an image reading apparatus drives automatic conveyance section 40 to convey document D placed on document feeding tray 41 to platen 27 automatically as stated above, thus, images of document D are read, then, rotation processing based on the detected inclination angle of document D is conducted for image data obtained through reading, inclination correction is performed, and image data are stored in image memory 34.

On the other hand, when a user places document D directly on platen 27 without using ADF 40, document D is not detected by ADF document sensor 31 when the user presses a start-reading button (S1).

When document D is not detected in S2, control means 37 outputs inclination correction processing prohibition signals representing signals prohibiting inclination correction processing (S9). When the inclination correction processing prohibition signals are outputted, image reading is started while inclination detection means 35, rotation processing means 36 and ADF 40 are all suspended (S10), and image data obtained through reading are stored in image memory 34. Namely, images on document D on platen 27 are read while automatic conveyance section 40 is not driven, and image data obtained through reading are stored in image memory 34 without conducting inclination correction processing (S11).

As stated above, there is made an arrangement, in the present embodiment, so that inclination correction is permitted when automatic conveyance section 40 is used, while, inclination correction is prohibited when automatic conveyance section 40 is not used. The basis for the foregoing is as follows: when a user places document D directly on platen 27, if inclination correction is conducted even when the user inclines document D intentionally, the user's intention is ignored. In the present embodiment, therefore, an arrangement is made as stated above, so that the user's intention may be reflected.

Next, there will be explained, by using a flow chart illustrating procedures to determine permission/prohibition of inclination correction processing shown in FIG. 5, an example to determine whether to conduct inclination correction or not depending upon whether automatic conveyance section 40 serving also as a platen cover is closed or not, even when the automatic conveyance section 40 is not used.

Figure 4:
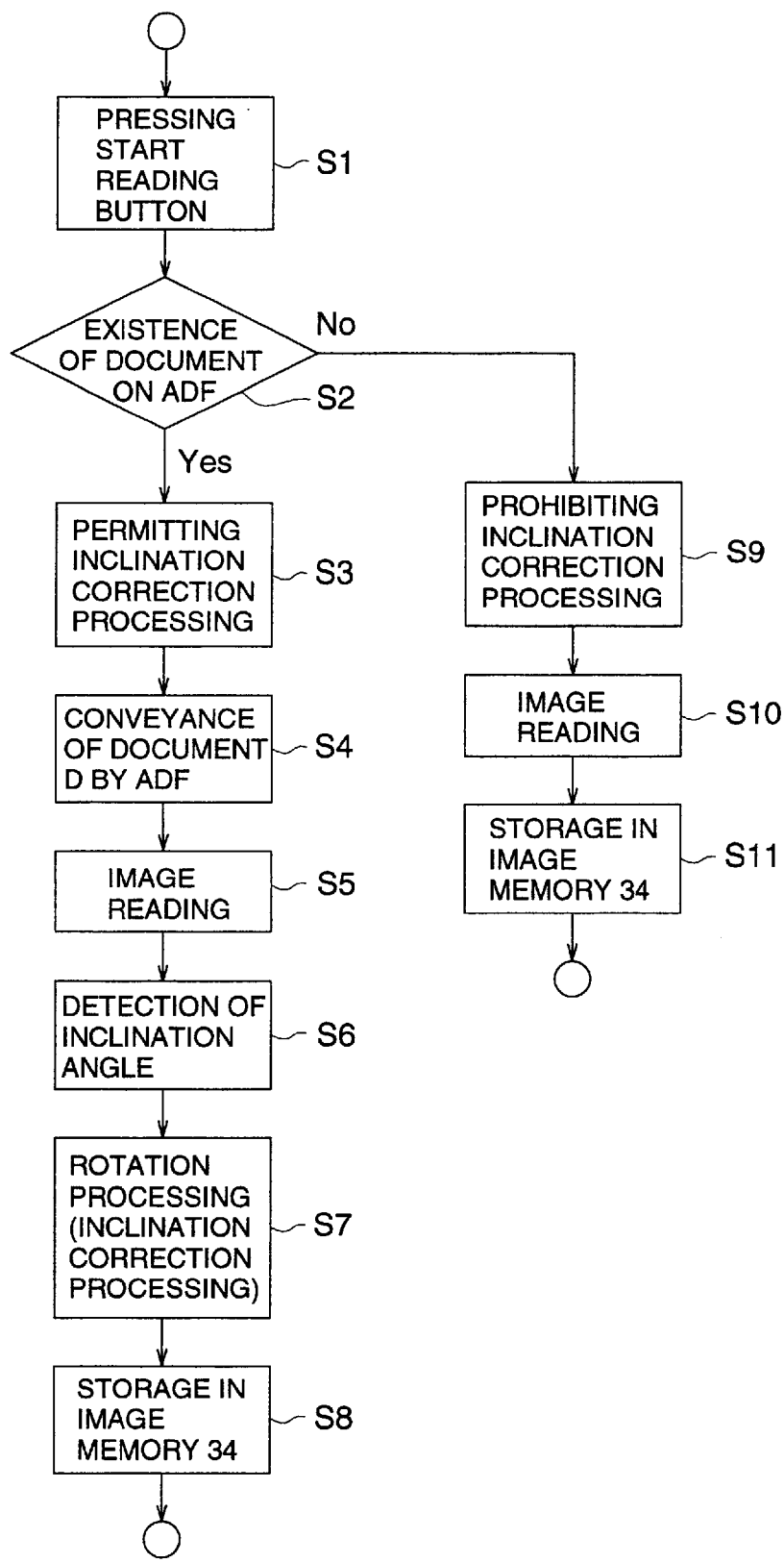
FIG. 4 is a flow chart illustrating procedures of determination of permission/prohibition for inclination correction processing.

Steps from S1 to S8 in a flow chart shown in FIG. 5 are procedures to conduct inclination correction when ADF 40 is used, and explanation for them will be omitted here because they are the same as procedures from S1 to S8 in FIG. 4.

In the present embodiment, even in the case where ADF 40 is not used (branch to "No" at S2 in FIG. 5), platen cover sensor 32 detects ADF 40 whether it is opened or closed (S21), and whether to conduct inclination correction or not is determined by the detection results.

Namely, after existence of document D placed on ADF 40 is detected in step S2, platen cover sensor 32 detects whether the automatic conveyance section 40 is opened or closed (S21 in FIG. 5). If the automatic conveyance section 40 is in the closed state, inclination correction processing permission signals are outputted in step S25 as stated above, and image reading is started in accordance with procedures in step S5 and thereafter. Namely, an image reading apparatus conducts image reading of images on document D placed on platen 27 without driving the automatic conveyance section 40 (S5), and image data thus obtained through reading are subjected to rotation processing based on the inclination of document D detected (S6) by inclination detection means 35, then, inclination correction is conducted (S7) on the image data which are then stored in image memory 34 (S8).

On the other hand, if the automatic conveyance section 40 is in the opened state, the inclination correction mentioned above is not conducted, and image reading is started. Namely, control means 37 outputs inclination correction processing prohibition signals (S22), and stores image data obtained through reading in image memory 34 (S24) without driving the automatic conveyance section 40 and conducting neither image reading for document D on platen 27 (S23) nor inclination correction.

As stated above, there is made an arrangement, in the present embodiment, so that inclination correction is permitted when ADF 40 is closed, while, inclination correction is prohibited when ADF 40 is opened. The basis for the foregoing is as follows: when twice-folded document D is unfolded and placed on platen 27, for example, or, when conducting reading after closing automatic conveyance section 40, the position of document D is often shifted on platen 27 in the course of closing the opened ADF 40 (ADF serving as a platen cover), and it is impossible to read image data accurately. (It is not an angle intended by a user). On the other hand, when conducting reading under the condition that ADF 40 is opened, a user holds document D so that the document is not shifted on platen 27, and it sometimes happens that a user inclines document D intentionally to place it. Therefore, by making an arrangement for determining whether to conduct inclination correction or not, in the same way as in the foregoing, even in the aforesaid occasion, an excellent image can be read.

Incidentally, although inclination correction is permitted or prohibited based on information of ADF document sensor 31 or of platen cover sensor 32 as in a flow shown in FIG. 5, in the present embodiment, if determination of whether to conduct inclination correction (rotation processing) or not is made by output of the sensors, it is not possible to meet various demands of users sufficiently. Therefore, it is possible to provide on operation section 30 a switching button with which a user can select whether to conduct inclination correction or not (ON/OFF switching), independently of information of the sensors. Namely, in the flow chart in FIG. 5, when the switching button is pressed, or when inclination correction is turned ON by the switching button in advance, on the occasion where inclination correction processing is prohibited (S22), it is possible to switch so that inclination correction may be conducted.

Next, an example to execute a trial mode will be explained as follows, referring to the block diagram shown in FIG. 3.

Image memory 34 is provided with capacity to store a plurality of image data subjected to rotation processing, and operation section 30 is provided with trial mode selection button 30b.

When trial mode selection button 30b is pressed and then, the start-reading button is pressed, image forming section 10 outputs one set of prints as a trial printing, prior to output of plural sets from one document D. The mode of this kind in a copying apparatus will be explained as follows by calling it a trial mode. When the start-reading button is pressed in this trial mode, it is possible to output one set of prints again, and image data are kept until the trial mode is canceled.

Namely, when the start-reading button (the start button which gives instructions to start image forming, in this case) is pressed after the trial mode selection button 30b is pressed, image reading section 20 starts reading images of document D, and control means 37 makes image data obtained through reading to be stored in the assigned memory space of image memory 34, and further, when inclination correction processing is conducted, the control means 37 makes the image data subjected to rotation processing to be stored in the assigned space which is different from the aforesaid memory space. Due to this, the image memory 34 enters the state wherein both the image data which have not received rotation processing and the image data which have received rotation processing are stored. Then, the first set of prints is outputted from image forming section 10 based on the image data which have received rotation processing.

In the present embodiment, it is possible to set a rotation angle by rotation angle setting key 30a before the button to start rereading is pressed in the trial mode. When a rotation angle is set and the button to start rereading is further pressed in the trial mode, the control means 37 conducts rotation processing on the image data which are stored in image memory 34 and have not received rotation processing, and makes the image data subjected to the rotation processing to be stored in image memory 34 again.

Then, image forming section 10 outputs one set of prints based on the image data subjected to the rotation processing. Even in this case, image data subjected to no rotation processing and image data subjected to rotation processing are stored in the image memory 34.

Due to this, it is possible for a user to conduct inclination correction processing again on image data subjected to no rotation processing stored in image memory 34, when the user is not satisfied with the rotation angle resulting from the inclination correction processing in the first trial printing.

Therefore, even when inclination correction processing is conducted again on image data used for making one set of prints as trial printing, and even when rotation processing by the rotation angle inputted by a user is conducted plural times, it is possible to obtain from image forming section 10 the output which are not deteriorated in terms of image quality, because rotation processing is always conducted from image data before image processing.

By the present invention, it becomes possible to read an image on a document if the document is intentionally inclined and set on the inclined condition by a user in an image reading apparatus capable of correcting inclination for the image of the document read by a reading device.

The image reading apparatus described in Structure (1) made it possible to obtain image data which meet the user's intention, because rotation processing in accordance with inclination of a document and rotation processing based on the rotation angle by a user from an external inputting means can be selected on an optimum basis according to the state.

The image reading apparatus described in Structure (2) made it possible to obtain image data which meet the user's intention, because rotation processing in accordance with inclination of a document and rotation processing based on the rotation angle by a user from an external inputting means can be selected on an optimum basis according to the state even when an automatic conveyance means is used, and rotation processing is further conducted after considering inclination of a document caused by the automatic conveyance means.

The image reading apparatus described in Structure (3) made it possible to obtain image data which meet the user's intention, because rotation processing in accordance with inclination of a document is selected and conducted under the state that no rotation angle is inputted, namely, that a user does not wish rotation processing based on prescribed rotation angle.

The image reading apparatus described in Structure (4) made it possible to reflect a user's intention because inclination correction which is inherent to the image reading apparatus is permitted when a document is conveyed by an automatic conveyance means to a reading position, while inclination correction is prohibited when a document is placed directly on a platen by a user.

The image reading apparatus described in Structure (5) made it possible to reflect a user's intention on an optimum basis even in the case where the platen cover is opened representing an occasion wherein a user most likely inclines a document to place it, among occasions where a user places a document directly on the platen, because inclination correction is permitted when the platen cover is closed, and inclination correction is prohibited when the platen cover is opened.

The image forming apparatus described in Structure (6) made it possible to obtain an image forming apparatus wherein image quality is not deteriorated even when inclination correction is conducted again on image data, and rotation processing by the rotation angle inputted by a user is repeated plural times in the case to execute a plurality of image processing like the trial mode.

The image forming apparatus described in Structure (7) made it possible to obtain an image forming apparatus wherein image quality is not deteriorated even when inclination correction is conducted again on image data to be used to make one set of prints as a sample, and rotation processing by the rotation angle inputted by a user is repeated plural times, both in the trial mode.

The image forming apparatus described in Structure (8) made it possible to obtain an image forming apparatus wherein image quality is not deteriorated even when rotation processing by the rotation angle inputted by a user is repeated plural times, because, when making one set of prints as a sample in the trail mode, rotation processing is conducted on image data obtained by reading output for the second set and thereafter with an image reading means, and images are formed based on the image data.

What is claimed is:

1. An image forming apparatus, comprising:

an image reader to read images of a document;

a rotation processor to conduct a rotation processing to correct inclination for image data obtained through reading by the image reader in accordance with inclination of a document;

a memory in which image data which have been subjected to the rotation processing by the rotation processor; and an image forming device to form an image on a recording material based on the image data stored in the memory, wherein the image data which have been subjected to rotation processing by the rotation processor and image data obtained through reading by the image reader are stored in the memory, wherein the image forming device includes a trial mode to form a single set of recording sheets prior to plural sets of recording sheets, and wherein the image forming device forms in the trial mode a single set of recording sheets based on the image data which are stored in the memory after having been subjected to rotation processing by the rotation processor.

2. The image forming apparatus of claim 1, further comprising:

an external inputting device for inputting arbitrary rotation angles;

wherein when the external inputting device inputs the rotation angles after the image forming device forms the single set of recording sheets in the trial mode, the rotation processor conducts the rotation processing for the image data stored in the memory in accordance with the inputted rotation angles and the image forming device forms an image based on the image data subjected to the rotation processing.

3. An image reading apparatus, comprising:

an automatic document conveyor to convey a document onto a platen;

an image reader to read images of the document conveyed by the automatic document conveyor and output image data of the document;

an inclination detector to detect inclination angles of the document conveyed by the automatic document conveyor;

an external inputting device to input arbitrary rotation angles to rotate the image data; and a rotation processor to conduct a rotation processing to rotate the image data of the document obtained by the image reader in accordance with both of the inclination angles detected by the inclination detector and the arbitrary rotation angles input by the external inputting device.

4. The image reading apparatus of claim 3, further comprising:

a memory which stores the image data that is subjected to rotation processing by the rotation processor.

5. The image reading apparatus of claim 4, wherein the image data obtained by the image reader is stored in the memory.

6. The image reading apparatus of claim 3, further comprising:

a controller which controls the rotation processor such that when the automatic document conveyor is not used, the rotation processor does not conduct the rotation processing.

* * * * *